United States Patent [19]

Weyand

[11] Patent Number: 4,724,121
[45] Date of Patent: Feb. 9, 1988

[54] POWDER TREATMENT PROCESS

[75] Inventor: John D. Weyand, Greensburg, Pa.

[73] Assignee: Aluminum Company of America, Pittsburgh, Pa.

[21] Appl. No.: 727,377

[22] Filed: Apr. 25, 1985

[51] Int. Cl.$^4$ .............................................. B22F 1/00
[52] U.S. Cl. ........................................ 419/19; 419/30; 419/31; 419/33; 419/37; 419/38; 419/49; 264/63; 264/125; 75/0.5 BA; 75/0.5 BB; 75/0.5 BC
[58] Field of Search ................. 419/2, 19, 31, 30, 36, 419/33, 37, 38, 49, 28; 75/0.5 BA, 0.5 BB, 252, 0.5 BC; 264/63, 125

[56] References Cited

U.S. PATENT DOCUMENTS

| | | | |
|---|---|---|---|
| 3,907,546 | 9/1975 | Port et al. | 419/30 |
| 4,028,095 | 6/1977 | Laferty et al. | 419/35 |
| 4,070,184 | 1/1978 | Scheithauer et al. | 419/18 |
| 4,109,060 | 8/1978 | Andersson et al. | 419/2 |
| 4,397,889 | 8/1983 | Benjamin et al. | 419/33 |
| 4,478,888 | 10/1984 | Benjamin et al. | 419/33 |
| 4,592,781 | 6/1986 | Cheney et al. | 419/31 |
| 4,613,371 | 9/1986 | Cheney et al. | 419/31 |

Primary Examiner—Stephen J. Lechert
Attorney, Agent, or Firm—Daniel A. Sullivan, Jr.

[57] ABSTRACT (1) A process comprising spray drying a powder-containing slurry, the slurry containing a powder constituent susceptible of oxidizing under the temperature conditions of the spray drying, while reducing the tendency for oxidation of the constituent by including as a liquid constituent of the slurry an organic liquid; (2) a process comprising spray drying a powder-containing slurry, the powder having been pretreated to reduce content of a powder constituent susceptible of oxidizing under the temperature conditions of the spray drying, the pretreating comprising heating the powder to react the constituent; and (3) a process comprising reacting ceramic powder, grinding the reacted powder, slurrying the ground powder, spray drying the slurried powder, and blending the dried powder with metal powder.

19 Claims, 2 Drawing Figures

POWDER TREATMENT PROCESS

The Government of the United States of America has rights in this invention pursuant to Contract No. DE-FC07-80CS40158 awarded by the U.S. Department of Energy.

SUMMARY OF THE INVENTION

It is an object of the invention to provide improved processing techniques for powders in powder metallurgy, powder ceramics, and powder cermets.

This as well as other objects which will become apparent from the discussion that follows are achieved, according to the present invention, by providing: (1) a process comprising spray drying a powder-containing slurry, the slurry containing a powder constituent susceptible of oxidizing under the temperature conditions of the spray drying, while reducing the tendency for oxidation of the constituent by including as a liquid constituent of the slurry an organic liquid; (2) a process comprising spray drying a powder-containing slurry, the powder having been pretreated to reduce content of a powder constituent susceptible of oxidizing under the temperature conditions of the spray drying, the pretreating comprising heating the powder to react the constituent; and (3) a process comprising reacting ceramic powder, grinding the reacted powder, slurrying the ground powder, spray drying the slurried powder, and blending the dried powder with metal powder.

DESCRIPTION OF THE PREFERRED EMBODIMENTS

Figure 1:
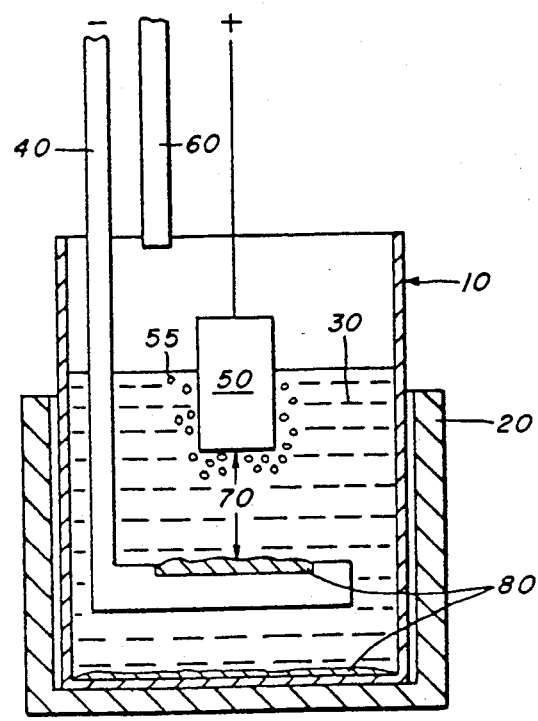
FIGS. 1 and 2 are elevational, partially cross-sectional views illustrating the invention.

FIG. 1 illustrates a laboratory-scale, electrolytic cell for producing aluminum metal. There is shown an alumina crucible 10 inside a protection crucible 20. Molten salt bath 30, based on cryolite, is provided in the alumina crucible and a graphite cathode 40 is provided in the bath. An anode 50, an electrode made according to the invention, also is shown. Bubbles 55 are oxygen gas being evolved during the electrolysis. Means 60 is shown for feeding alumina to the bath. The anode-cathode distance is shown by double-ended arrow 70. Aluminum metal 80 produced during a run is represented on the cathode and on the bottom of the cell.

Anode 50 comprises an alloy of at least two metals. The oxide of one of the metals is more resistant than that of the other metal to attack by the molten salt, while the oxide of the other metal is more resistant than that of the first metal to the diffusion of oxygen.

It has been discovered that the oxide which forms on the alloy exhibits neither a dilution of the resistance of the first oxide to attack by molten salt nor a dilution of the resistance of the second oxide to diffusion of oxygen, at least not to any practical extent. Consequently, one achieves an electrode material which is very resistant in service as an anode evolving oxygen in a molten salt.

In a preferred embodiment, the metal whose oxide is more resistant to molten salt is copper.

Nickel is one embodiment of the metal whose oxide is more resistant to the diffusion of oxygen.

Tin is another embodiment of a metal whose oxide is more resistant to molten salt as compared to the oxide of Ni. A ternary alloy of Cu, Ni and Sn is thus another example of the invention.

Further embodiments combining the bath resistance of copper oxide with a good barrier to the diffusion of oxygen are Cu-Fe, Cu-Ag, Cu-Zn, Cu-Pd, Cu-Au, Cu-Rh, Cu-Ir, Cu-Pt, Cu-Mg, Cu-Al, Cu-Zr and Cu-Y.

Anode 50 may be provided as essentially totally metal. Alternatively, it may be provided in the form of a cermet such as in U.S. Pat. Nos. 4,374,050, 4,374,761, 4,399,008, 4,454,015, 4,455,211, and 4,478,693.

An oxide coating on the alloy may be originated simply by using the alloy as an oxygen evolving anode. Alternatively, the alloy may be placed in an oxidizing atmosphere for a time and temperature sufficient to precoat the alloy with an oxide coating.

When the electrode is made essentially just of metal, usual metallurgical manufacturing techniques are sufficient for its manufacture.

In an experiment, just copper metal alone was used as anode in electrolysis of alumina dissolved in a cryolite-based molten salt bath. Subsequently, oxide on the surface of the copper was analyzed and found to be a combination of $CuAlO_2$ and $Cu_2O$. Unfortunately, the oxide coating on Cu alone spalls off over time, so that Cu alone is not a successful inert anode. According to an alternative form of the invention, copper oxide, and preferably $CuAlO_2$ or $Cu_2O$ or the two mixed together, is sintered to form an anode 50, and used for electrolysis of alumina. In this form, as a block, the copper oxide will not spall from itself, and it becomes a successful electrode, for instance an inert anode evolving oxygen in the electrolysis of alumina.

The following are examples of suitable cermet manufacturing techniques according to the invention.

A. Reaction Sintering

Raw materials are mixed by V-blending, spray dried in a closed system to form agglomerates, cold isostatically pressed to near-net shape, green machined to shape, and sintered. A $NiFe_2O_4$, Ni-Fe alloy, and NiO final phase assemblage of the densified inert anode is created in situ by reaction sintering. Final sintered densities for anodes manufactured in this manner range from 5.65 to 5.89 g/cm$^3$. Image analysis indicates 17 to 25 vol. % metal and 3 to 8 vol. % porosity are present in the anode structure. The reaction sintering approach results in a heterogeneous distribution of the pores and metal particles in the short rang order of the microstructure. The metal particles are not uniform in shape and can be described as "wormy" in shape, discontinuous in two dimensions, but continuous in three dimensions.

The reaction sintering approach and the resulting displacement reaction of Fe with NiO forming Ni and the formation of $NiFe_2O_4$ in situ creates porosity under the pressureless sintering conditions employed. The use of finer starting raw materials has not been studied in detail, because they are not generally commercially available. However, preliminary experiments with expensive, fine powder sized raw material did not result in a denser microstructure.

B. Cold Press Sinter of Calcined Cermet Powder

The process flow diagram for this fabrication process includes: the V-blending of all of the raw materials as received, calcination of this powder at 900° to 1000° C. for two hours in argon or nitrogen, ball mill or jet mill grinding to break up sintered agglomerates, spray dry in an open or closed system spray dryer to produce flowable powder, cold press, and pressureless sinter to 1350° C. in argon for four hours. Fabrication of inert anodes by this process produces a denser microstructure. $NiFe_2O_4$ alloy and NiO phases are produced in the powder during the calcination step. Grinding the powder prior to spray drying produces a powder with the required fineness and reactivity to produce a dense part on sintering. This process results in several changes in the microstructures from the reaction sinter process. First, the pores and metal phases are more evenly distributed in the short range order of the microstructure. Second, the density is increased. Third, the porosity and pore size are decreased. Fourth, the metal particle size is decreased and the metal particle shapes are more uniform. These changes are important in that the denser structure presents less surface area to the electrolyte bath for corrosion and may, therefore, increase the stability of the anode. However, the smaller, less continuous metal particles result in a decrease in the electrical conductivity from about 150 $ohm^{-1}cm^{-1}$ to about 50 $ohm^{-1}cm^{-1}$ when compared to reaction sintered cermet anodes.

C. Sintering Calcined Oxide Powder Mixed With Metal Additions

Another process route that can be followed to fabricate dense cermet anodes consists of: mixing NiO with $Fe_2O_3$, calcination at 900° to 1000° C., grinding by ball milling or jet milling, spray drying in an open spray dryer, V-blending nickel metal into the spray dried agglomerates, cold pressing, and sintering.

A series of cermet samples with nickel additions ranging from zero to 30 wt % were fabricated from a spray dried inert anode oxide powder and two grades of nickel from INCO. The nickel powder median particle size was 8.2 and 26.5 microns for grades 123 and HDNP, respectively. Samples were sintered at 1350° C. for two hours in argon in both a large Pereny furnace and a small AT Inc. tube furnace. In all cases, the weight percent metal present in the sintered microstructure exceeded the amount added to the original oxide powder by 3 to 6%. The measured porosity by image analysis was between 1 and 2%. The coarseness of the nickel increased with increasing nickel content. The metal from the 123 Ni is finer than from the HDNP Ni. However, the difference in particle size in the sintered microstructure is not as great as one would expect from the size of the original Ni metal powders. The density of the compacts fired in the Pereny furnace is higher than those fired in the small tube furnace. The reason for this density difference is probably related to the lower $pO_2$ levels expected in the Pereny furnace from residual carbon deposits in the furnace liner and the binder burnout occurring during the heating and sintering cycle. The lower $pO_2$ results in higher metal contents in the Pereny fired samples because of oxide reduction and a resultant higher density.

Nickel added to the calcined oxide powder results in fabricated densities that are 98 to 99% of theoretical density. These results indicate that the addition of Ni metal to a calcined oxide, as a process for fabrication, produces denser anodes than any other process method investigated to date. The same process may be employed with Cu-Ni or other alloy additions to oxide inert anode powder in order to fabricate cermet anodes with the highest expected density, and therefore, possess maximum stability in the Hall cell electrolyte bath.

D. Other Manufacturing Techniques

The cermets can as well be made by mixing oxide powder, nickel powder, and copper powder, followed by sintering. Cermets where the metal powder composition is 90% Cu, 10% Ni, and 80% Cu, 20% Ni, have yielded satisfactorily dense anodes.

Other techniques are disclosed in U.S. Pat. Nos. 4,374,050, 4,374,761, 4,399,008, 4,454,015, 4,455,211, and 4,478,693.

Inert anode 50 may be held in position by use of a diffusion welded joint to a nickel stub bar connection. Diffusion welds are made by reducing the inner surface of the anode to be joined with a reductant such as carbon, and diffusion welding by heating the nickel stub and reduced inert anode surface together to 1000° C. and holding for several hours under a nominal 0.4 MPa pressure. The performance of the diffusion welded joint is excellent with respect to electrical conductivity and strength during short-term testing. However, stability of the joint is suspect for long-term performance in Hall cell environments because of bath penetration, nickel stub corrosion, void creation, and creep. Therefore, several different improved connection designs have been investigated. These include graded, plasma sprayed coatings, and mechanical designs.

It has been demonstrated in small scale (2.5 to 7.5 cm diameter) tests that mechanically sound connections can be fabricated by grading mixtures of nickel metal with a cermet composition in increasing nickel content metal layers until the last layer is all nickel. These layers and anode powder are isostatically pressed together, sintered, and diffusion welded to wrought nickel stubs. See U.S. Pat. No. 4,500,406.

Another method of applying graded layers and finally a nickel layer to fabricated cermet inert anodes is by use of the plasma spray technique. Experiments have shown that mixtures of spray dried inert powder mixed with nickel metal can be successfully plasma sprayed onto either cermet or nickel metal substrates with 35 to 38 MPa bond strengths. Advantages of this technique compared to isostatic pressing are that less material is used, and the fabrication is easier.

A mechanical connection has also been designed, fabricated, tested, and evaluated. A new anode design similar to a thick bottom "flask" was developed to couple with the nickel stub mechanically and to operate the connection at a lower temperature. The new connection design eliminates the problems associated with the diffusion welded design. That is, the mechanical connection is not dependent on the strength of the weld and should not change with time as long as the bath does not penetrate to the connection area.

Other connection methods are disclosed in U.S. Pat. Nos. 4,450,061, 4,456,517, 4,457,811, 4,468,298, 4,468,299, and 4,468,300.

Further illustrative of the invention are the following examples.

EXAMPLE I

An oxide composition of 80% $NiFe_2O_4$ and 20% NiO was prepared by mixing appropriate amounts of NiO and $Fe_2O_3$ in manufacturing Technique C above. The spray dried oxide was then mixed with 17% of Cu powder, 10 micron size, cold pressed and sintered to yield a cylindrical, 3-inch diameter, inert anode of 83% oxide, 17% metal alloy of copper and nickel. The nickel metal is thought to arise in the sintering because of the presence of an organic binder introduced in the spray drying. A certain amount of the nickel oxide transforms to nickel metal, with the oxygen being lost as water and/or carbon dioxide by reaction with the organic binder. EDAX image analysis showed that the alloy was about 85% Cu, 15% Ni.

The resulting cermet anode was used as an anode 50 in a 960° C., cryolite-based, molten salt bath of cryolite ratio (wt. NaF/wt AlF$_3$)=1.15, containing 5% CaF$_2$ and being saturated with alumina. The anode was immersed ½-inch into the bath, and electrolysis was carried out at a current density of one ampere/cm$^2$ (number of amperes through cell divided by the area of the anode bottom, i.e. $\pi \cdot$(3-inches)$^2$/4 with inches of course converted to centimeters) to produce oxygen at the anode and aluminum at the cathode. The test was run for 168 hours, and the anode showed a wear rate of 0.7 inches per year.

Steady state values in the produced aluminum metal were as follows:
0.18% Fe±0.05%
0.087% Ni±0.034%
0.104% Cu±0.027%
The best 30-hour period averaged:
Fe 0.14
Cu 0.07
Ni 0.06

Current efficiency, i.e. the percent of the current flow which produced aluminum, was 84%. This figure increases with time following initiation of electrolysis, since the beginning period is of low efficiency due to sodium intercalation in the graphite cathode. As the intercalation sites become filled, more and more current goes to aluminum production.

Examination of the anode after the 168 hour test showed no zone of internally oxidized alloy. There was essentially no loss of metal phase.

The following examples of manufacturing techniques are designated by letters matching the above overview Sections A to C.

EXAMPLE A

The following materials were dry mixed in a V-blender: 60% green NiO of median particle diameter in the 2 to 3 micron range;
20% 20-micron-median Fe;
20% 0.1 to 0.7 micron range, 0.3 to 0.4 micron median, Fe$_3$O$_4$.

The dry mixture was then mixed with isopropyl alcohol. Percent solids can be in the range 56 to 74%.

To this slurry is added, as binder, 1% (based on solids) polyvinyl butyral (Butvar B-76 of Monsanto). Mixing was at 33° C. with 2% H$_2$O in a high shear mixer.

The slurry was then spray dried using pressure nozzle atomization, 120 to 150 psig, in a cylindrical Niro atomizer of 8.5-foot diameter, 5.5-foot height, with the dry powder being collected in a 60° cone on the bottom of the cylinder. A nitrogen atmosphere was used in the spray dryer. Slurry temperature was about 30° C., nitrogen inlet temperature 115° to 130° C., nitrogen outlet temperature 75° to 85° C.

This yielded spherical agglomerates of 100 to 120 micron average particle size. These agglomerates flow easily into isostatic pressing dies and are pressable. Spray drying in this manner provides an increased bulk density and tends to eliminate flaws and density gradients.

Isostatic pressing of 3-inch diameter cylinders for anodes is at 20,000 to 30,000 psi. The pressed material can be machined in its green, or unsintered, condition.

The sintering furnace used electrical resistance heating with SiC elements. It was purged with argon or nitrogen. Heat cycle was slow (about ½° C./min) to 400° C. to remove binder and then faster (about 5° C./min) to 1350° C. where the anode was held for four hours, followed by furnace cooling at about 100° C. per hour.

EXAMPLE B

The same 60-20-20 mixture as in Example A was heated to 800° to 1000° C., preferably about 900° C., to yield a friable mass of agglomerated material analyzing 1 to 5% NiO, 20% Ni, remainder NiFe$_2$O$_4$.

The agglomerated material was ground in a ball mill or in a fluid-energy mill (jet impact mill) to produce a dry powder.

In preparation for spray drying, the powder was mixed with water at 50 to 70% solids. Also mixed in was binder at a level of 1 to 2% of solids. Various binders can be used as follows:
50% PVA, 50% PEG
80% PVA, 20% PEG,
where PVA means polyvinyl alcohol and PEG means polyethylene glycol. The PEG is used to soften the PVA.

In one mode of this Example, the solids was at 60% in the water, and the binder, based on solids, was at 1.5 to 1.85% PVA, 0.25% dispersant (Davan 7) (keeps powder in suspension in the water), and 0.25% isostearic acid (to soften the PVA and to act as a lubricant in pressing).

Spray drying was in a Niro dryer of 8.5-foot diameter, 10-foot height. The atmosphere was air, inlet temperature 200° to 250° C., outlet 100° C.

Isostatic pressing and subsequent sintering was as in Example A.

EXAMPLE C 51.7% NiO and 48.3% Fe$_2$O$_3$ were mixed and then calcined at 900°–1000° C. to form an agglomerated material which was milled and then spray dried as in Example B. The oxide powder was then blended with various amounts of metal powder. Isostatic pressing and subsequent sintering was as in Example A.

Comparing Examples A, B and C, the following densities were obtained at 30% Ni metal content:
A—5.8 g/cc
B—6.0 g/cc
C—6.3 g/cc

EXAMPLE AD

A 5.8 g/cc sintered billet produced as in Example A was hot isostatic pressed using argon gas pressure at 1100° C. and 41.4 MPa pressure. Density was increased to 6.1 g/cc.

EXAMPLE BD

A 6.0 g/cc sintered billet produced as in Example A was hot isostatic pressed using argon gas pressure at 1100° C. and 41.4 MPa pressure. Density was increased to 6.1 g/cc.

The following Example II is an example of an anode connection.

EXAMPLE II

A graded connection like that of U.S. Pat. No. 4,500,406 was produced by a plasma spray technique as follows.

Various compositions ranging from pure cermet to pure nickel were plasma sprayed onto a cermet electrode by passing a plasma gun across the face of a cermet electrode rotating in a lathe.

A gas mixture of argon and a powder composition carrying cover gas was used. Temperatures were on the order of 10,000° K.

Porosity of the connection was reduced as compared to the reduction process of making a connection.

EXAMPLE III

A mechanical connection like that mentioned above was formed as follows.

Figure 2:
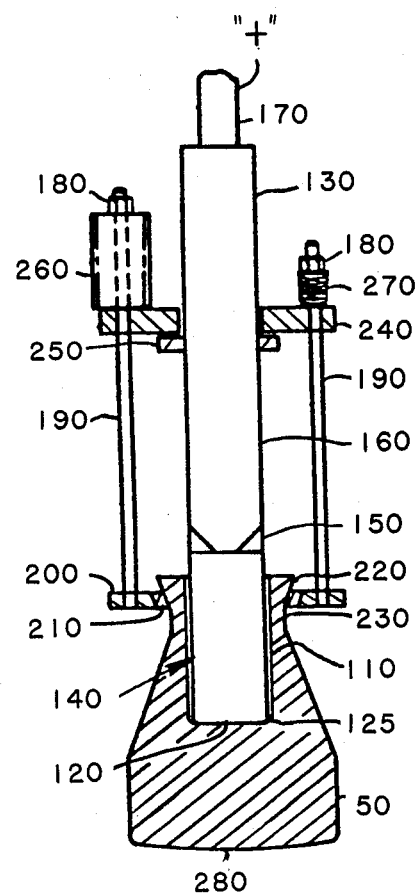

With reference to FIG. 2, anode 50 is shaped to the form of a flask by machining a green cylinder formed, for example, as in Example A.

The flask is provided with a cavity 110, and the interface 120 for electrical current transfer between anode 50 and conductor rod 130 is located within the cavity.

The anode surface at interface 120 has been reduced from cermet to metal, as described e.g. in U.S. Pat. No. 4,468,298. This reduced surface is ground flat and smooth; the conductor rod surface at interface 120 is likewise ground flat and smooth. Both surfaces are painted with platinum paste 125, before assembly, to resist movement of oxygen into the interface during service and to assure low electrical resistance at the interface.

Conductor rod 130 is a composite series of metals, with a nickel portion 140 within the cavity, this in turn being welded at 150 to a steel portion 160, and this in turn joined to a copper portion 170 forming the "+" connection for introduction of the electrical current for electrolysis.

Reasons for using the combination of copper, steel and nickel are:

(1) Copper metal is the standard material used for anode rods. Reasons are that copper is preferred for contact against a bus bar and has high conductivity and thus provides low voltage drop and low power consumption.
(2) Steel is used in the intermediate position because it is very economical. Also, it will withstand higher temperatures than copper and still maintain its strength.
(3) Nickel is used for corrosion reasons. Pure nickel is a preferred metal for contact with the inert anode without causing corrosion.

Conductor rod 130 is forced toward the anode to create a 150 psi minimum pressure at interface 120 for easy conduction of electrical current across the interface.

This pressure is created by appropriate tightening of nuts 180 on tie rods 190. The tie rods pull on the anode 50 by way of annular flange 200 bearing on split ring 210. (For assembly, flange 200 is lowered down over the flask collar 220 into the area 230 of minimum flask diameter. There, two semicircles comprising split ring 210 are laid in their seat in flange 200. Then flange 200 is lifted to bring the inner surface of split ring 210 into contact with the matching tapered surface on the flask collar.) Ring 210 in turn bears against the flask collar 220.

The tie rods pull on conductor rod 130 by way of annular flange 240 bearing against annular flange 250 welded to the steel portion 160. Interposed coil springs 260 or Belleville different parts caused by temperature changes. If the springs were not there, small thermal contractions or expansions would cause large fluctuations in the pressure at interface 120.

As a further development of the mechanical connection, it can be merged with diffusion welding as in U.S. Pat. No. 4,468,298. The nickel portion 140 can be first welded to anode 50 at interface 120 in a separate step and then the resulting assembly can be fit into the remaining structure of FIG. 2 so as to keep the diffusion welded joint in compression at all times during use.

In use, end 280 of the anode is immersed in the bath.

All percentages are on a weight basis, unless noted otherwise.

While the invention has been described in terms of preferred embodiments, the claims appended hereto are intended to encompass all embodiments which fall within the spirit of the invention.

What is claimed is:

1. A process comprising spray drying a powder-containing slurry, the slurry being free of carbides, the slurry containing a powder constituent susceptible of oxidizing under the temperature conditions of the spray drying, while reducing the tendency for oxidation of the constituent by providing, as the liquid constituent of the slurry, organic liquid which is essentially free of water.

2. A process as claimed in claim 1, further comprising spray drying into an atmosphere of reduced oxidizing character as compared to air.

3. A process as claimed in claim 1, the constituent comprising iron.

4. A process as claimed in claim 1, the organic liquid comprising isopropyl alcohol.

5. A process as claimed in claim 3, the slurry further comprising NiO and $Fe_3O_4$ powders and a binder, further comprising pressing and sintering the product of the spray drying.

6. A process as claimed in claim 5, further comprising hot isostatic pressing the sintered product.

7. A process comprising spray drying a powder-containing slurry, the powder having been pretreated to reduce content of a powder constituent susceptible of oxidizing under the temperature conditions of the spray drying, the pretreating comprising heating the powder to react the constituent with other components of the powder.

8. A process as claimed in claim 7, the constituent comprising iron.

9. A process as claimed in claim 8, the powder before pretreatment comprising NiO, Fe and $Fe_3O_4$.

10. A process as claimed in claim 9, further comprising grinding the pretreated powder, including binder in the slurry, and pressing and sintering the product of the spray drying.

11. A process as claimed in claim 10, further comprising hot isostatic pressing the sintered product.

12. A process as claimed in claim 8, the slurry comprising essentially water as its liquid component, the spray drying being into an air atmosphere.

13. A process comprising reacting ceramic powder by calcining such that components of the powder, react with one another, grinding the reacted powder, slurrying the ground powder, spray drying the slurried powder, and blending the dried powder with metal powder.

14. A process as claimed in claim 13, the ceramic powder comprising NiO and $Fe_2O_3$.

15. A process as claimed in claim 14, the slurry containing binder, further comprising pressing and sintering the blended powders.

16. A process comprising spray drying a powder-containing slurry, the slurry being free of carbides, the slurry containing a powder constituent susceptible of oxidizing under the temperature conditions of the spray drying, while reducing the tendency for oxidation of the constituent by including as a liquid constituent of the slurry and organic liquid, the constituent comprising iron.

17. A process comprising spray drying a powder-containing slurry, the slurry being free of carbides, the slurry containing a powder constituent susceptible of oxidizing under the temperature conditions of the spray drying, while reducing the tendency for oxidation of the constituent by including as a liquid constituent of the slurry an organic liquid, the organic liquid comprising isopropyl alcohol.

18. A process as claimed in claim 16, the slurry further comprising NiO and $Fe_3O_4$ powders and a binder, further comprising pressing and sintering the product of the spray drying.

19. A process as claimed in claim 18, further comprising hot isostatic pressing the sintered product.

* * * * *